(12) United States Patent
Zhong et al.

(10) Patent No.: US 12,722,460 B2
(45) Date of Patent: Sep. 1, 2026

(54) LIFTGATE HOCKEY STICK ATTACHMENT

(71) Applicant: Magna Exteriors Inc., Aurora (CA)

(72) Inventors: Shunlie Zhong, Shanghai (CN); Chang Wang, Shanghai (CN); Xiaoqiang Xu, Shanghai (CN)

(73) Assignee: Magna Exteriors Inc., Aurora (CA)

( * ) Notice: Subject to any disclaimer, the term of this patent is extended or adjusted under 35 U.S.C. 154(b) by 365 days.

(21) Appl. No.: 18/460,548

(22) Filed: Sep. 3, 2023

(65) Prior Publication Data

US 2024/0075795 A1 Mar. 7, 2024

Related U.S. Application Data

(60) Provisional application No. 63/403,905, filed on Sep. 6, 2022.

(51) Int. Cl.
*B60J 5/10* (2006.01)

(52) U.S. Cl.
CPC .................................... *B60J 5/107* (2013.01)

(58) Field of Classification Search
CPC . B60J 5/107; B60J 5/0468; B60J 5/101; B60J 5/106
See application file for complete search history.

(56) References Cited

U.S. PATENT DOCUMENTS

2023/0219401 A1* 7/2023 Mira Palacios ........ B60J 5/0418
49/501

FOREIGN PATENT DOCUMENTS

FR 3021909 A1 * 12/2015 .............. B60J 5/107
KR 20100000845 A * 1/2010 ............ B60J 5/0413

* cited by examiner

*Primary Examiner* — Dany E Akakpo

(57) ABSTRACT

A liftgate support bracket connection arrangement for a vehicle liftgate. The liftgate can be for a rear vehicle liftgate or any other type of liftgate found on a vehicle. Connected to the composite inner panel are support brackets. The inner panel of a liftgate has a plurality of bosses formed on an outer surface of the inner panel. Each of the support brackets has a plurality of apertures corresponding in number to the plurality of bosses. Each one of the plurality of apertures is configured to align with one of the plurality of bosses and then screws are used to mechanically fasten the support bracket to the inner panel.

18 Claims, 3 Drawing Sheets

LIFTGATE HOCKEY STICK ATTACHMENT

FIELD OF THE INVENTION

The present invention relates to an arrangement for attaching a support bracket to a liftgate inner panel of a vehicle.

BACKGROUND OF THE INVENTION

Many types of vehicles have a liftgate that form a door for an opening to the vehicle's passenger compartment. The liftgate is often very heavy, therefore, it is desirable to construct the liftgate out of lighter materials. This involves connecting together inner and outer panels. In particular when the inner panel is formed of composite material it is desirable to attach reinforcement brackets at strategic locations, to strengthen certain regions where hinges and other components are attached. Additionally, the brackets help to stiffen the structure to prevent the inner panel and outer panel from twisting.

There are several types of brackets that are attached. One particular bracket is referred to as a "hockey stick" bracket that is attached to the upper left and upper right covers of the inner panel. It is called a hockey stick bracket because the curved shape and width of the bracket is reminiscent of the shape of one end of an ice hockey stick. The hockey stick bracket often is used to provide support and attachment points for the hinges that connect the liftgate to the body of the vehicle. In addition to hockey stick brackets, there are other types of brackets that are attached, which include but are not limited to door latch brackets used to connected door handles and lock components as well as strut support brackets that are used to connect support struts between the vehicle body and the liftgate.

The different brackets are typically attached using adhesives to glue the brackets to the inner panel or sometimes the brackets are over-molded to the inner panel. These attachment methods are more time consuming but are desirable because they prevent unwanted sink marks or blemishes on the visible surfaces of the liftgate. It is desirable to provide a simpler attachment arrangement that uses fasteners which would shorten production time. It is further desirable to provide an attachment arrangement that prevents unwanted sink marks and blemishes on the visible surfaces of the liftgate. Also, when connecting brackets to the inner panel the connection must be strong enough to support the attachment of other structures (e.g., hinges, latches, etc.). Therefore, there is a need to provide arrangements using fasteners that provide a desired amount of support as evidenced by the amount of torque that the fastener arrangement provides.

SUMMARY OF THE INVENTION

The present invention is directed to a liftgate support bracket connection arrangement for a vehicle liftgate, where the liftgate can be for a rear vehicle liftgate or any other type of liftgate found on a vehicle. In one embodiment of the invention the liftgate is a composite liftgate formed from a composite inner panel that is connected to an outer panel which can be metal or composite. Connected to the composite inner panel are support brackets. The inner panel of a liftgate has a plurality of bosses formed on an outer surface of the inner panel. Each of the support brackets has a plurality of apertures corresponding in number to the plurality of bosses. Each one of the plurality of apertures is configured to align with one of the plurality of bosses.

There are a plurality of screws that correspond in number to a plurality of bosses formed on the inner panel. Each of one of the plurality of screws has a shoulder and a threaded shaft. Each one of the plurality of screws is configured to slide through one of the plurality of apertures of the at least one support bracket so that the shoulder of each of the plurality of screws contacts the at least one support bracket, while the threaded shaft connects with one of the plurality of bosses of the outer panel thereby connecting the at least one support bracket to the inner panel.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
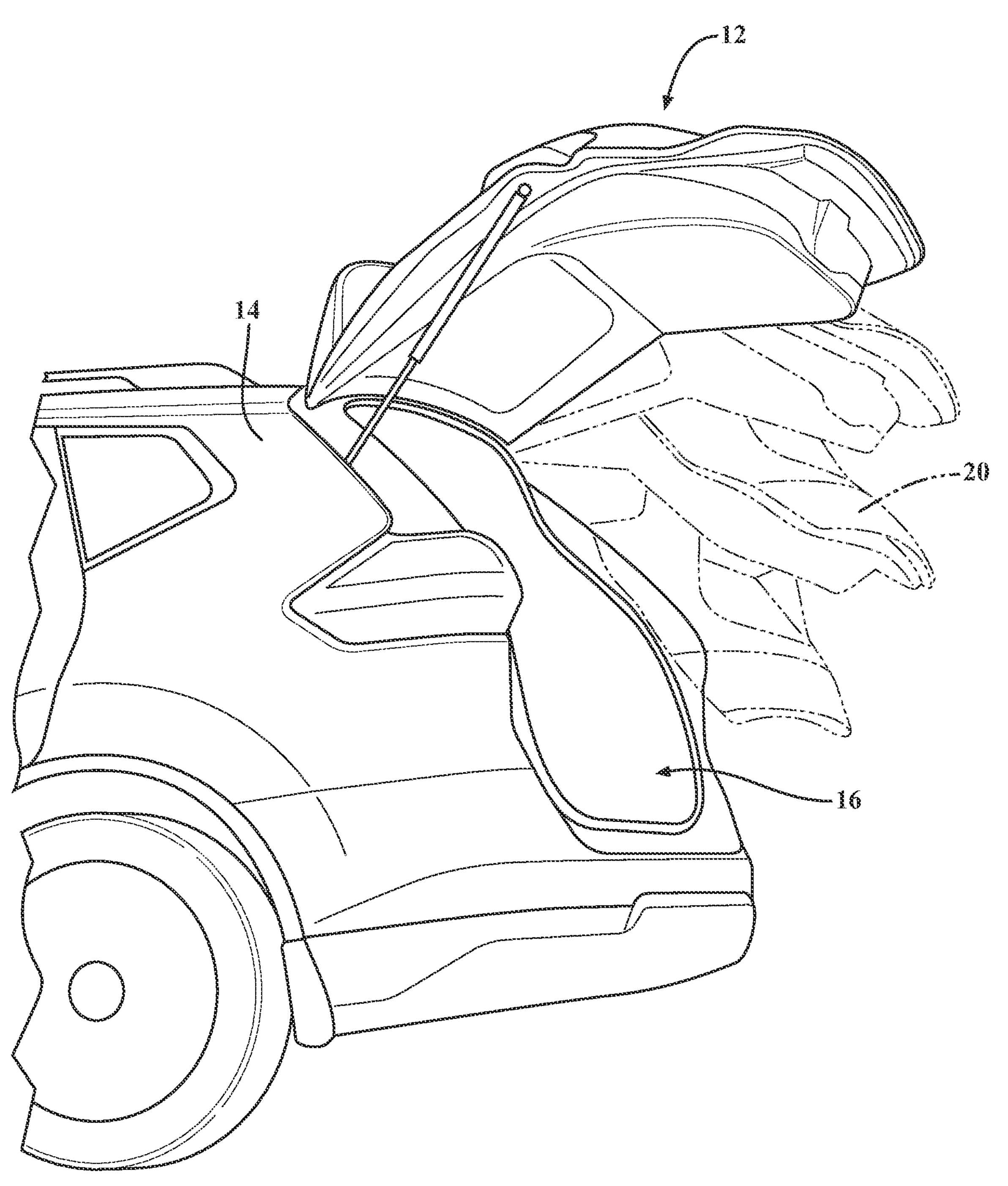
FIG. 1 is a rear side perspective view of a vehicle rear liftgate.

Referring now to FIGS. 1-4 a liftgate support bracket connection arrangement 10 for a vehicle liftgate 12 is shown. The vehicle liftgate 12 in FIG. 1 is shown as being a rear liftgate that is pivotally connected to a vehicle 14 to open and close a rear aperture 16 leading to the vehicle compartment. While a rear liftgate is shown it is within the scope of this invention for the vehicle liftgate 12 to be any type of liftgate used on a vehicle and not necessarily be limited to a rear liftgate. For example, there are certain side doors that open vertically in the similar manner as a rear liftgate, while pickup truck tail gates typically open by rotating downward; the present invention can be implemented on both types of closures. Additionally, the arrangement of the present invention can be used for compartment doors on vehicles.

In one embodiment of the invention the liftgate 12 is a composite liftgate formed from an inner panel 18 formed of composite material. The inner panel 18 is connected to an outer panel 20 which can be metal or composite. Connected to the inner panel 18 is a support bracket 22. While only one support bracket 22 is shown it is within the scope of the invention for there to be any desired number of support brackets connected to the inner panel 18 depending on the need of a particular application. Reinforcement brackets are used in many locations for different purposes, including areas where latches, handles, window wiper motors or struts are connected. In the present embodiment of the invention the support bracket 22 is used in the upper left corner, with a correlating support bracket (not shown) in the upper right corner, each forming what are often called hockey stick brackets because of their curved shape. The hockey stick brackets are used to connect hinges and provide support between the liftgate 12 and the vehicle 14, so that the liftgate 12 can pivot between an open and closed position as shown in FIG. 1. The support bracket 22 has a curved shape that includes a first reinforcement surface 24 that extends vertically in a first direction. The support bracket 22 also includes a second reinforcement surface 26 that extends horizontally in a second direction and an intersection 28 that is a curved transition surface or region of the support bracket 22 that transitions from the first reinforcement surface 24 to the second reinforcement surface 26.

The inner panel 18 of the liftgate 12 has a plurality of connections 30-37 between the support bracket 22 and the inner panel 18. Connection 34 is at a position within the intersection 28 between where the first reinforcement surface 24 and the second reinforcement surface 26 are located, which provides at least one attachment within the intersection 28 that helps to stabilize and prevent twisting of the support bracket 22 when connected to the inner panel 18.

Figure 2:
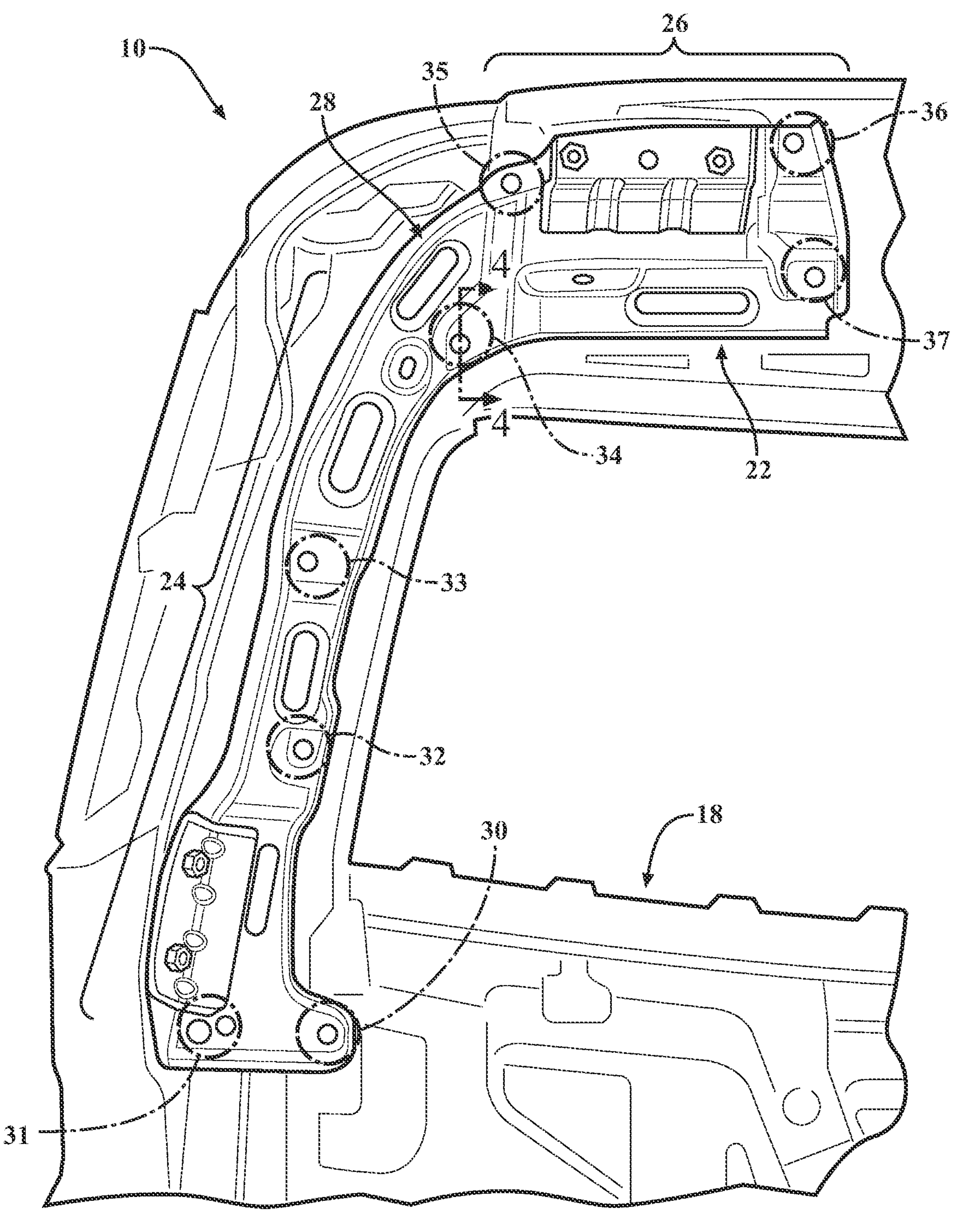
FIG. 2 is a partial plan view of a liftgate inner panel with a support bracket connected.
Figure 4:
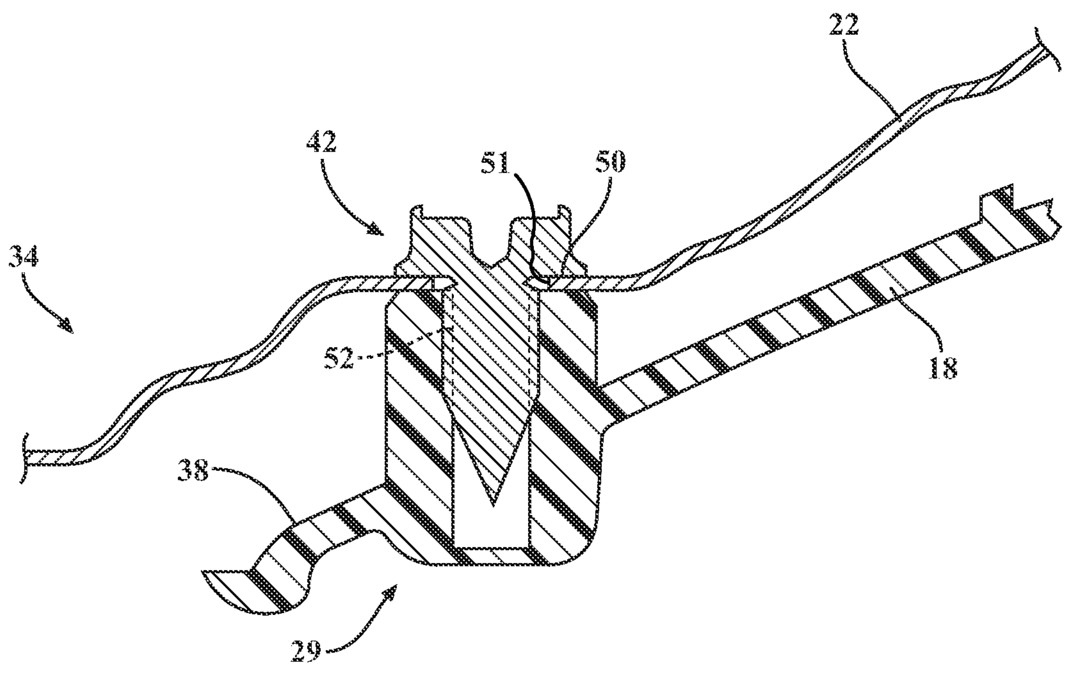
FIG. 4 is a side cross-sectional elevational view of one of the screws connecting the reinforcement bracket to a boss of the inner panel.

The detail of connection 34 is shown in FIG. 4 which will now also be referenced, however, all of the other connections 30-33 and 35-37 have the same features as now described herein. Connection 34 includes a boss 29 formed on an outer surface 38 of the inner panel 18. The support bracket 22 has a plurality of apertures corresponding in number to the connections 30-37. FIG. 4 shows an aperture 51 of the support bracket 22 that aligns with the boss 29, respectively. Connecting the support bracket 22 to the inner panel is accomplished using a screw 42. The screw 42 has a shoulder 50 and a threaded shaft 52 and is configured to slide through the respective aperture 51 of the support bracket 22 so that the shoulder 50 of screw 42 contacts the support bracket 22 and the threaded shaft is threaded into the boss 29. As shown in FIG. 2 there are a total of eight connections of the type shown in FIG. 4, however, it is within the scope of the invention for there to be a greater or lesser number of connections depending on the parameters of a particular application.

Figure 3:
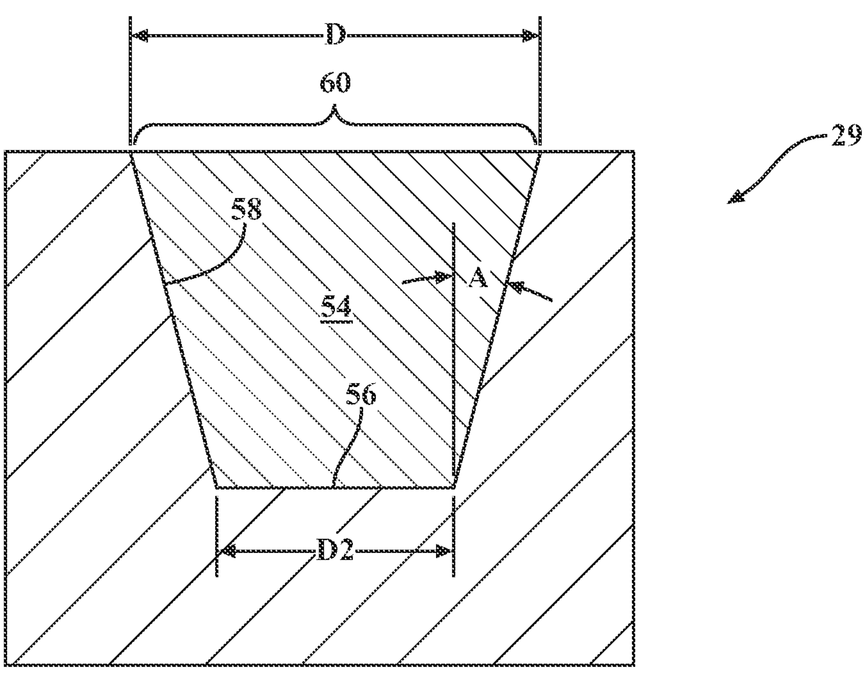
FIG. 3 is a side cross sectional view of a boss formed on the liftgate inner panel.

FIG. 3 is an enlarged view of the boss 29, the details of which will now be discussed. The boss 29 has a bore 54 defined by a bottom surface 56, inside diameter wall 58 and a top aperture 60. The inside diameter wall 58 is conical in shape and has a draft angle A of at least 0.5 degrees from the bottom surface 56 to the top aperture 60, the bottom surface 56 has a diameter D2 of 5.15 mm, which allows for the screw 42 to be an M6.5 screw with the threaded shaft 52 having a diameter of 6.5 mm. An inside diameter D the inside diameter wall 58 is a maximum of 5.4 mm. When the screw 42 is connected to the boss 29 it is tightened down to at least 4.0 Nm of torque, which is made possible by the dimensions of the boss 29 and the screw 42. This amount of torque is required to properly fasten the support bracket 22 to the inner panel 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate support bracket connection arrangement comprising:

an inner panel of a liftgate having a plurality of bosses formed on an outer surface of the inner panel;

at least one support bracket having a plurality of apertures corresponding in number to the plurality of bosses, wherein each one of the plurality of apertures is configured to align with one of the plurality of bosses;

a plurality of screws corresponding in number to the plurality of bosses, wherein each of one of the plurality of screws has a shoulder and a threaded shaft where the threaded shaft of each one of the plurality of screws is received through one of the plurality of apertures of the at least one support bracket so that the shoulder of each of the plurality of screws contacts the at least one support bracket, while the threaded shaft connects with one of the plurality of bosses of the inner panel thereby connecting the at least one support bracket to the inner panel, and wherein at least part of a threaded portion of each of the plurality of bosses has a draft angle of at least 0.5 degrees.

2. The liftgate support bracket connection arrangement of claim 1 wherein each of the plurality of bosses has an inside wall with the draft angle of at least 0.5 degrees from a bottom surface of the boss to a top aperture of the boss.

3. The liftgate support bracket of claim 2 wherein the bottom surface of each of the plurality of bosses has a diameter of 5.15 mm.

4. The liftgate support bracket of claim 1 wherein each of the plurality of screws is an M6.5 screw having a threaded shaft with an outside diameter of 6.5 mm and a head with the shoulder.

5. The liftgate support bracket of claim 4 wherein each of the plurality of bosses has an inside diameter of 5.4 mm.

6. The liftgate support bracket of claim 4 wherein each of the plurality of screws is connected to the respective one of the plurality of bosses with at least 4.0 Nm of torque.

7. The liftgate support bracket connection arrangement of claim 1 further comprising:

wherein the at least one support bracket is a hockey stick bracket having a first reinforcement surface extending in first direction and a second reinforcement surface connected to the first reinforcement surface and extending in a second direction, and wherein the plurality of bosses of the inner panel are eight bosses for each at least one support bracket, with one of the eight bosses is formed at an intersection between the first reinforcement surface and the second reinforcement surface when the support bracket is connected to the inner panel.

8. A liftgate support bracket connection arrangement comprising:

an inner panel of a liftgate having a plurality of bosses formed on an outer surface of the inner panel;

at least one support bracket having a plurality of apertures corresponding in number to the plurality of bosses, wherein each one of the plurality of apertures is configured to align with one of the plurality of bosses, wherein the at least one support bracket is a hockey stick bracket having a first reinforcement surface extending in a first direction and a second reinforcement surface connected to the first reinforcement surface and extending in a second direction;

a plurality of screws corresponding in number of the plurality of bosses, wherein each of one of the plurality of screws has a shoulder and a threaded shaft where the threaded shaft of each one of the plurality of screws is received through one of the plurality of apertures of the at least one support bracket so that the shoulder of each of the plurality of screws contacts the at least one support bracket, while the threaded shaft connects with one of the plurality of bosses of the inner panel thereby connecting the at least one support bracket to the inner panel, and wherein one of the plurality of bosses of inner panel is formed at an intersection between the first reinforcement surface and the second reinforcement surface when the support bracket is connected to the inner panel.

9. The liftgate support bracket connection arrangement of claim 8 wherein each of the plurality of bosses has an inside diameter with a draft angle of at least 0.5 degrees from a bottom surface of the boss to a top aperture of the boss.

10. The liftgate support bracket of claim 9 wherein the bottom surface of each of the plurality of bosses has a diameter of 5.15 mm.

11. The liftgate support bracket of claim 8 wherein each of the plurality of screws is an M6.5 screw having the threaded shaft with an outside diameter of 6.5 mm and a head with the shoulder.

12. The liftgate support bracket of claim 11 wherein each of the plurality of bosses has an inside diameter of 5.4 mm.

13. The liftgate support bracket of claim 11 wherein each of the plurality of screws is connected to the respective one of the plurality of bosses with at least 4.0 Nm of torque.

14. A liftgate support bracket connection arrangement comprising:

an inner panel of a liftgate having a plurality of bosses formed on an outer surface of the inner panel wherein each of the plurality of bosses has an inside diameter with a draft angle of at least 0.5 degrees from a bottom surface of the boss to a top aperture of the boss;

at least one support bracket having a plurality of apertures corresponding in number to the plurality of bosses, wherein each one of the plurality of apertures is configured to align with one of the plurality of bosses;

a plurality of screws corresponding in number to the plurality of bosses, wherein each of one of the plurality of screws has a shoulder and a threaded shaft where the threaded shaft of each one of the plurality of screws is received through one of the plurality of apertures of the at least one support bracket so that the shoulder of each of the plurality of screws contacts the at least one support bracket, while the threaded shaft connects with one of the plurality of bosses of the inner panel thereby connecting the at least one support bracket to the inner panel and each of the plurality of screws is connected to the respective one of the plurality of bosses with at least 4.0 Nm of torque.

15. The liftgate support bracket of claim 14 wherein the bottom surface of each of the plurality of bosses has a diameter of 5.15 mm.

16. The liftgate support bracket of claim 14 wherein each of the plurality of screws is an M6.5 screw having the threaded shaft with an outside diameter of 6.5 mm and a head with the shoulder.

17. The liftgate support bracket of claim 16 wherein each of the plurality of bosses has an inside diameter of 5.4 mm.

18. The liftgate support bracket connection arrangement of claim 14 further comprising:

wherein the at least one support bracket is a hockey stick bracket having a first reinforcement surface extending in first direction and a second reinforcement surface connected to the first reinforcement surface and extending in a second direction, and wherein the plurality of bosses of inner panel are eight bosses for each at least one support bracket, with one of the eight bosses is formed at an intersection between the first reinforcement surface and the second reinforcement surface when the support bracket is connected to the inner panel.

* * * * *